US011734384B2

(12) United States Patent
Kalantzis et al.

(10) Patent No.: US 11,734,384 B2
(45) Date of Patent: Aug. 22, 2023

(54) DETERMINATION AND USE OF SPECTRAL EMBEDDINGS OF LARGE-SCALE SYSTEMS BY SUBSTRUCTURING

(71) Applicant: International Business Machines Corporation, Armonk, NY (US)

(72) Inventors: Vasileios Kalantzis, White Plains, NY (US); Lior Horesh, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 17/035,121

(22) Filed: Sep. 28, 2020

(65) Prior Publication Data

US 2022/0101156 A1 Mar. 31, 2022

(51) Int. Cl.
*G06F 17/16* (2006.01)

(52) U.S. Cl.
CPC .................................. *G06F 17/16* (2013.01)

(58) Field of Classification Search
None
See application file for complete search history.

(56) References Cited

U.S. PATENT DOCUMENTS 9,891,344 B2 2/2018 Allard et al.
9,904,740 B1 * 2/2018 Ni ....................... G06F 16/9024
10,255,392 B2 4/2019 Kim et al.
2010/0082724 A1 4/2010 Diyankov et al.
2012/0059777 A1 * 3/2012 Paiva ..................... G06N 20/10
706/12

(Continued)

FOREIGN PATENT DOCUMENTS

CN 103679161 A 3/2014
CN 103941222 B 2/2016

(Continued)

OTHER PUBLICATIONS

Ikramov, Matrix Pencils, Theory, Applications, and Numerical Methods, Seriyi Mathematicheskii Analz, vol. 29, pp. 3-106, 1991.*

(Continued)

*Primary Examiner* — David J Stoltenberg
(74) *Attorney, Agent, or Firm* — Mark Bergner

(57) ABSTRACT

A device solves for eigenvalues of a matrix system. The device performs a domain decomposition of a matrix system into non-overlapping subdomains and a reordering of matrices of the matrix system. An interface variable projection subspace associated with interface variables of an adjacency graph of the matrix system is created. The interface variables are related to nodes of the adjacency graph which are connected with nodes located in neighboring partitions. An internal variable projection subspace is created that is associated with internal variables of the adjacency graph of the matrix system, wherein the internal variables are related to nodes of the adjacency graph which are connected only to nodes located in the same partition. A projection matrix is built based on the interface variable projection subspace and the internal variable projection subspace. The device determines eigenvalues that solve a Raleigh-Ritz eigenvalue problem utilizing the projection matrix.

20 Claims, 7 Drawing Sheets

(56) References Cited

U.S. PATENT DOCUMENTS

| | | | | |
|---|---|---|---|---|
| 2015/0212119 A1* | 7/2015 | Mezic | ................. | G05B 15/02 |
| | | | | 702/60 |
| 2016/0299874 A1 | 10/2016 | Liao | | |
| 2017/0212868 A1 | 7/2017 | Huang et al. | | |
| 2019/0138568 A1* | 5/2019 | Chien | ................. | G06F 17/16 |
| 2019/0213233 A1* | 7/2019 | Wang | ................. | G06F 30/20 |
| 2019/0236227 A1 | 8/2019 | Gope et al. | | |
| 2020/0083902 A1 | 3/2020 | Martens | | |
| 2020/0175092 A1 | 6/2020 | Atasu | | |
| 2022/0261440 A1* | 8/2022 | Furutani | ............ | G06F 16/9024 |

FOREIGN PATENT DOCUMENTS

| | | | |
|---|---|---|---|
| CN | 107871139 A | 4/2018 | |
| CN | 111310807 A | 6/2020 | |
| CN | 111507387 A | 8/2020 | |
| WO | 2004111759 A2 | 12/2004 | |
| WO | 2022063216 A1 | 3/2022 | |

OTHER PUBLICATIONS

Lancaster et al., Variational and Numerical Methods for Symmetric Matrix Pencils, Bulletin of Australia Mathematical Society, vol. 43, 1991.*

Haardt et al., Simultaneous Schur Decomposition of Several Nonsymmetric Matrices to Achieve Automatic Pairing in Multidimensional Harmonic Retrieval Problems, IEEE Transactions on Signal Processing, vol. 46, No. 1, Jan. 1998.*

Guojian Yin, A Contour-Integral Based Method with Schur-Rayleigh-Ritz Procedure for Generalized Eigenvalue Problems, Journal of Scientific Computing (2019) 81:252-270.*

Meerbergen, K. et al., "The Lanczos Method for Parameterized Symmetric Linear Systems With Multiple Right-Hand Sides", 21 pages.

Bennighof, Jeffrey K. et al., "An Automated Multilevel Substructuring Method for Eigenspace Computation in Linear Elastodynamics", vol. 25, No. 6, 23 pages, Jun. 2004.

Bekas, C. et al., "Computation of Smallest Eigenvalues using Spectral Schur Complements", 17 pages, Jan. 27, 2004.

He, W. et al., "Large-scale IP network behavior anomaly detection and identification using substructure-based approach and multivariate time series mining", Telecommun Syst (2012) 50:1-13, Aug. 4, 2010.

Kalantzis, V., "A Spectral Newton-Schur Algorithm for the Solution of Symmetric Generalized Eigenvalue Problems", vol. 52, pp. 132-153, 2020.

Yin, G., "A Contour-Integral Based Method with Schur-Rayleigh-RitzProcedure for Generalized Eigenvalue Problems", Journal of Scientific Computing 81:252-270 (2019).

Mell, P. et al., "The NIST Definition of Cloud Computing", Recommendations of the National Institute of Standards and Technology, NIST Special Publication 800-145, 7 pages, Sep. 2011.

PCT/CN2021/120229, International Search Report and Written Opinion, dated Dec. 21, 2022.

Kalantzis, Vasileios. (2018). Domain decomposition algorithms for the solution of sparse symmetric generalized eigenvalue problems. Retrieved from the University of Minnesota Digital Conservancy, https://hdl.handle.net/11299/201170.

* cited by examiner

DETERMINATION AND USE OF SPECTRAL EMBEDDINGS OF LARGE-SCALE SYSTEMS BY SUBSTRUCTURING

BACKGROUND

Disclosed herein is a system and related method for determining and utilizing eigenvectors (embeddings) of large sparse symmetric matrix pencils, which may occur in a variety of technical applications, including, e.g., spectral clustering and frequency response analysis.

This disclosure considers the determination and application of eigenpairs, consisting of eigenvalues and eigenvectors, using an algebraic domain decomposition scheme to compute a selected number of eigenpairs of large and sparse symmetric matrix pencils. These eigenpairs are computed by means of a Rayleigh-Ritz projection. The projection subspace is divided into two separate subspaces, each one associated with one of the two types of variables: interior, and interface. The projection subspace associated with interface variables is built by computing a few of the eigenvectors and associated first and second derivatives of a zeroth-order approximation of the non-linear matrix-valued interface operator.

The projection subspace associated with interior variables is built independently in each subdomain by exploiting local eigenmodes and matrix resolvent approximations. The sought eigenpairs are then approximated by means of a Rayleigh-Ritz projection. The proposed technique may result in computational resource improvements over other processes, such as the shift-and-invert Lanczos, and Automated MultiLevel Substructuring combined with p-way vertex-based partitionings.

SUMMARY

According to one aspect disclosed herein, a computer-implemented method is provided comprising, using a processor of a device to solve for eigenvalues of a matrix system. The method comprises, using a processor of the computing device loading the matrix system into a memory of the computing device, and performing a domain decomposition into non-overlapping subdomains and a reordering of matrices of the matrix system. An interface variable projection subspace associated with interface variables of an adjacency graph of the matrix system is created, wherein the interface variables are related to nodes of the adjacency graph which are connected with nodes located in neighboring partitions. The method further comprises creating an internal variable projection subspace associated with internal variables of the adjacency graph of the matrix system, wherein the internal variables are related to nodes of the adjacency graph which are connected only to nodes located in the same partition. The method further comprises building a projection matrix based on the interface variable projection subspace and the internal variable projection subspace, determining eigenvalues that solve a Raleigh-Ritz eigenvalue problem utilizing the projection matrix, and utilizing the determined eigenvalues in a technical application system.

Advantageously, this approach may: a) preserve the advantages of algebraic domain decomposition eigenvalue solvers, such as reduced orthogonalization costs and inherent parallelism, while, at the same time, b) increase their accuracy without considering more than one shift.

According to another aspect disclosed herein, method may be applied to a technical application system that is selected from the group consisting of a clustering analytic system and a frequency response analytic system. Advantageously, when applying the techniques in these situations, a reduction in time and processing resources may be realized.

According to another aspect disclosed herein, the method may incorporate the clustering analytic system in an artificial intelligence (AI) classification system, and the frequency response analytic system may be selected from the group consisting of an audio analytic system and a building structure analytic system. The application to these technological areas may help reduce costs by requiring less computational demand.

According to another aspect disclosed herein, the method may further, when creating an interface variable projection subspace associated with interface variables, utilize a zeroth-order truncation of a spectral Schur complement. Advantageously, this avoids computation of a derivative of the spectral Schur complement.

According to another aspect disclosed herein, an apparatus for a technical system comprises a memory and a processor. The processor is configured for loading the matrix system into a memory of the computing device, and performing a domain decomposition into non-overlapping subdomains and a reordering of matrices of the matrix system. An interface variable projection subspace associated with interface variables of an adjacency graph of the matrix system is created, wherein the interface variables are related to nodes of the adjacency graph which are connected with nodes located in neighboring partitions. The processor is further configured for creating an internal variable projection subspace associated with internal variables of the adjacency graph of the matrix system, wherein the internal variables are related to nodes of the adjacency graph which are connected only to nodes located in the same partition. The processor is further configured for building a projection matrix based on the interface variable projection subspace and the internal variable projection subspace, determining eigenvalues that solve a Raleigh-Ritz eigenvalue problem utilizing the projection matrix, and utilizing the determined eigenvalues in a technical application system.

Advantageously, this approach may: a) preserve the advantages of algebraic domain decomposition eigenvalue solvers, such as reduced orthogonalization costs and inherent parallelism, while, at the same time, b) increase their accuracy without considering more than one shift.

According to another aspect disclosed herein, the apparatus may further, when creating an interface variable projection subspace associated with interface variables, utilize a zeroth-order truncation of a spectral Schur complement. Advantageously, this avoids computation of a derivative of the spectral Schur complement.

According to another aspect disclosed herein, the apparatus may be applied to a technical application system that is selected from the group consisting of a clustering analytic system and a frequency response analytic system. Advantageously, when applying the techniques in these situations, a reduction in time and processing resources may be realized.

According to another aspect disclosed herein, the apparatus may incorporate the clustering analytic system in an artificial intelligence (AI) classification system, and the frequency response analytic system may be selected from the group consisting of an audio analytic system and a building structure analytic system. The application to these technological areas may help reduce costs by requiring less computational demand.

According to another aspect disclosed herein, a computer program product is provided for a technical analytical system. The computer program product comprises one or more computer readable storage media, and program instructions collectively stored on the one or more computer readable storage media. The program instructions comprise program instructions for loading the matrix system into a memory of the computing device, and performing a domain decomposition into non-overlapping subdomains and a reordering of matrices of the matrix system. An interface variable projection subspace associated with interface variables of an adjacency graph of the matrix system is created, wherein the interface variables are related to nodes of the adjacency graph which are connected with nodes located in neighboring partitions. The instructions further configure the processor for creating an internal variable projection subspace associated with internal variables of the adjacency graph of the matrix system, wherein the internal variables are related to nodes of the adjacency graph which are connected only to nodes located in the same partition. The instructions further configure the processor for building a projection matrix based on the interface variable projection subspace and the internal variable projection subspace, determining eigenvalues that solve a Raleigh-Ritz eigenvalue problem utilizing the projection matrix, and utilizing the determined eigenvalues in a technical application system.

Advantageously, this approach may: a) preserve the advantages of algebraic domain decomposition eigenvalue solvers, such as reduced orthogonalization costs and inherent parallelism, while, at the same time, b) increase their accuracy without considering more than one shift.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Overview

Figure 1A:
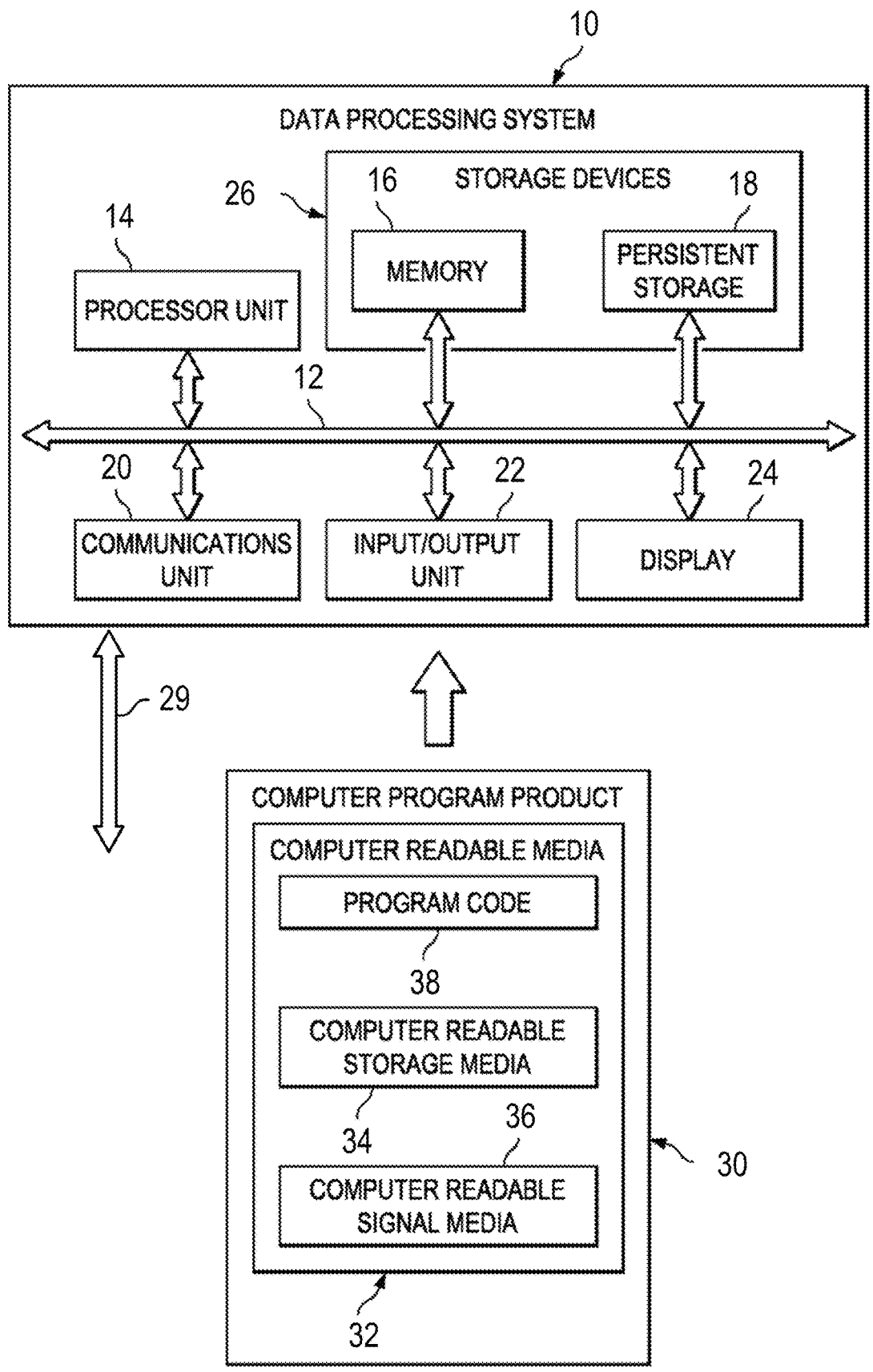
FIG. 1A is a block diagram of a data processing system (DPS) according to one or more embodiments disclosed herein.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk
EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
PaaS platform as a service
PDA personal digital assistant
PLA programmable logic arrays
RAM random access memory
RISC reduced instruction set computer
ROM read-only memory
SaaS software as a service
SLA service level agreement
SRAM static random-access memory
WAN wide-area network Data Processing System in General FIG. 1A is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip.

As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 116 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1A further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Cloud Computing in General

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1B:
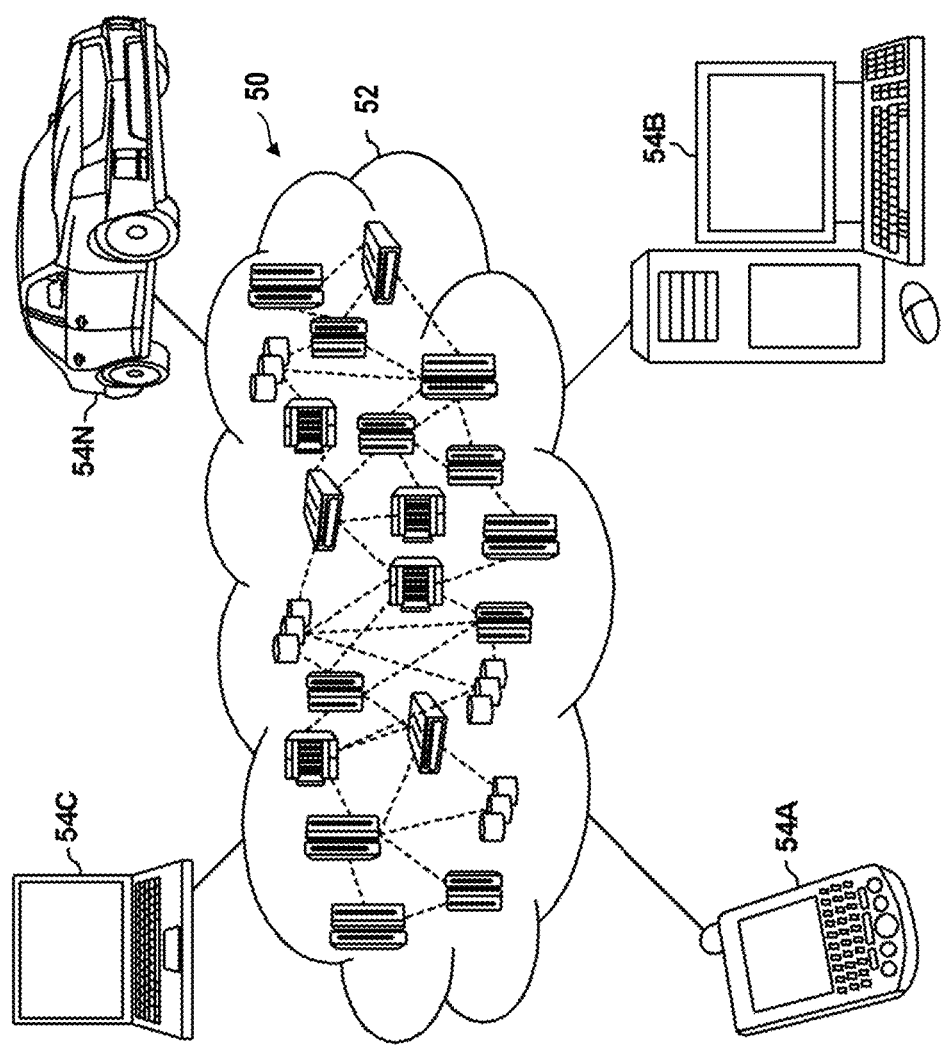
FIG. 1B is a pictorial diagram that depicts a cloud computing environment according to an embodiment disclosed herein.

Referring now to FIG. 1B, illustrative cloud computing environment 52 is depicted. As shown, cloud computing environment 52 includes one or more cloud computing nodes 50 with which local computing devices used by cloud consumers, such as, for example, personal digital assistant (PDA) or cellular telephone 54A, desktop computer 54B, laptop computer 54C, and/or automobile computer system 54N may communicate. Nodes 50 may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 1B are intended to be illustrative only and that computing nodes 50 and cloud computing environment 52 can communicate with any type of computerized device over any type of network and/or network addressable connection (e.g., using a web browser).

Figure 1C:
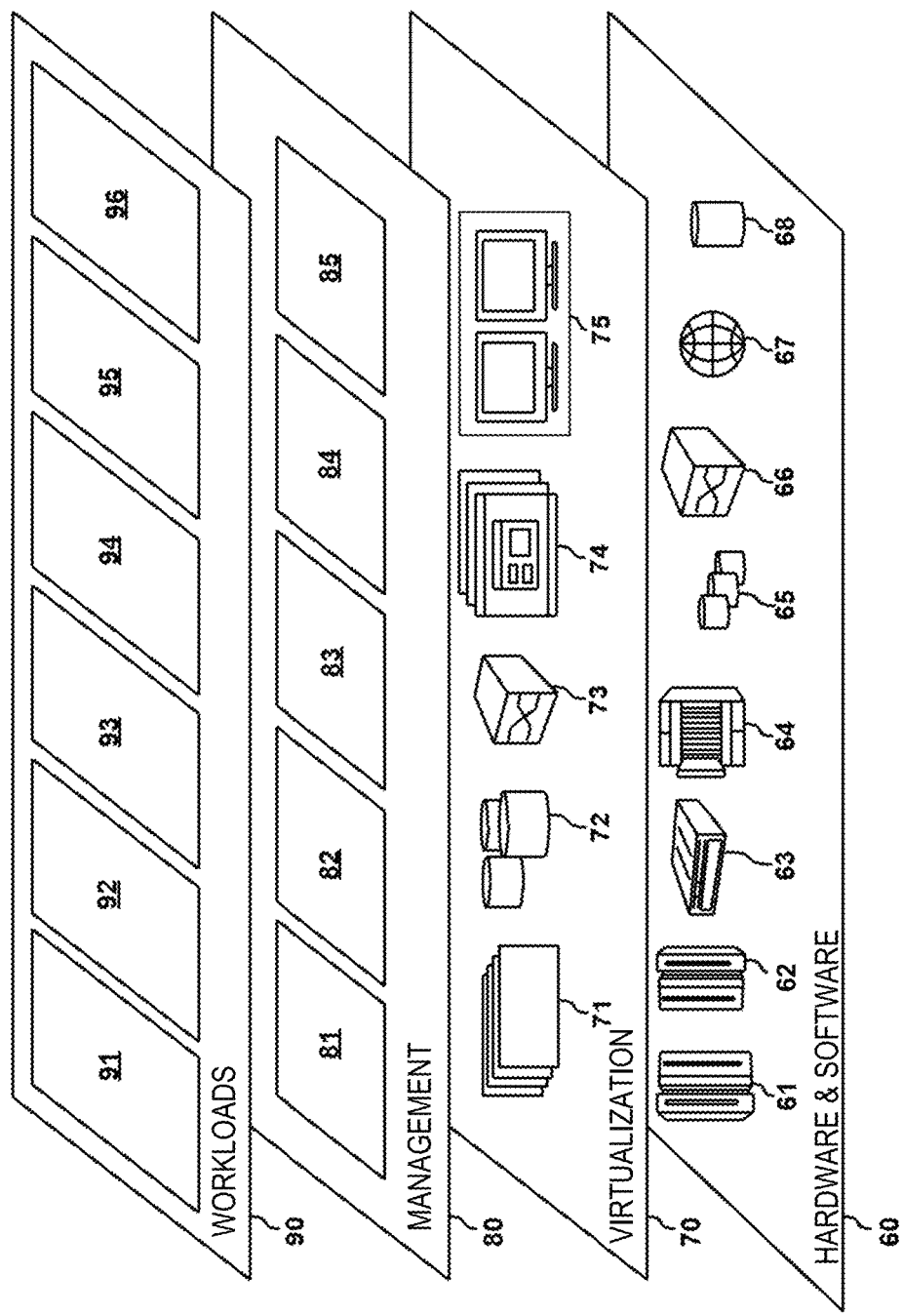
FIG. 1C is a pictorial diagram that depicts abstraction model layers according to an embodiment disclosed herein.

Referring now to FIG. 1C, a set of functional abstraction layers provided by cloud computing environment 52 (FIG. 1B) is shown. It should be understood in advance that the components, layers, and functions shown in FIG. 1C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Any of the nodes 50 in the computing environment 52 as well as the computing devices 54A-N may be a DPS 10.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Determination and Use of Eigenvalues and Eigenvectors of Large-Scale Systems

A technical analytic system is described herein that produces a solution that may be subsequently applied to solve real-word technical problems. Such a technical analytic system may, for example, be a spectral clustering analytic system, a frequency response analytic system, or any other system that utilizes matrices as described herein. More generally, the system described herein can be seen as a computationally efficient approach to generate spectral embeddings. These embeddings can be used for the purposes of dimensionality reduction.

Spectral Clustering Analysis

Spectral clustering is a technique with roots in graph theory, where the approach is used to identify communities of nodes in a graph based on the edges connecting them. Clustering is one of the main tasks in unsupervised machine learning. The goal is to assign unlabeled data to groups, with an aim that similar data points get assigned to the same group. Spectral clustering is a popular variant of clustering which uses information from the eigenvalues (spectrum) of special matrices built from a graph or data set. In particular, spectral clustering applies clustering algorithms to identify different communities in which the data lie, but it does so on an embedded or sketched version of the initial data. This step, which can be also seen as a dimensionality reduction idea, is fulfilled through the computation of a few of the eigenvectors of a similarity matrix.

In multivariate statistics and the clustering of data, spectral clustering techniques make use of the spectrum (eigenvalues) of a similarity matrix of the data to perform dimensionality reduction before clustering in fewer dimensions. The similarity matrix is provided as an input and comprises of a quantitative assessment of the relative similarity of each pair of points in the dataset. In application to image segmentation, spectral clustering is known as segmentation-based object categorization.

Given an enumerated set of data points, the similarity matrix may be defined as a symmetric matrix A, where $A_{ij} \geq 0$ represents a measure of the similarity between data points with indices i and j. The general approach to spectral clustering is to use a standard clustering method (there are many such methods, k-means is discussed below) on relevant eigenvectors of a Laplacian matrix of A. There are many different ways to define a Laplacian which have different mathematical interpretations, and so the clustering will also have different interpretations. The eigenvectors that are relevant are the ones that correspond to smallest several eigenvalues of the Laplacian except for the smallest eigenvalue which will have a value of zero, if the graph is connected. If the graph is not connected, then the number of zero eigenvalues is equal to the number of connected components.

Spectral clustering may relate to partitioning of a mass-spring system, where each mass is associated with a data point and each spring stiffness corresponds to a weight of an edge describing a similarity of the two related data points. Specifically, the eigenvalue problem describing transversal vibration modes of a mass-spring system is exactly the same as the eigenvalue problem for the graph Laplacian matrix defined as $$L := D - A,$$

where D is the diagonal matrix $$D_{ii} = \sum_j A_{ij}.$$

The masses that are tightly connected by the springs in the mass-spring system move together from the equilibrium position in low-frequency vibration modes, so that the components of the eigenvectors corresponding to the smallest eigenvalues of the graph Laplacian can be used for meaningful clustering of the masses. One related spectral clustering technique is the normalized cuts algorithm or Shi-Malik algorithm commonly used for image segmentation. It partitions points into two sets $(B_1, B_2)$ based on the eigenvector v corresponding to the second-smallest eigenvalue of the symmetric normalized Laplacian defined as $$L^{norm} := I - D^{-1/2} A D^{-1/2}$$

A mathematically equivalent algorithm takes the eigenvector corresponding to the largest eigenvalue of the random walk normalized adjacency matrix $P = D^{-1} A$.

Knowing the eigenvectors, partitioning may be done in various ways, such as by computing the median m of the components of the second smallest eigenvector v, and placing all points whose component in v is greater than m in $B_1$ and the rest in $B_2$. The algorithm can be used for hierarchical clustering by repeatedly partitioning the subsets in this fashion.

Spectral clustering is computationally expensive unless a fast technique to compute a large number of eigenvectors (i.e., spectral embeddings) is available. State-of-the-art approaches rely on the application of the (unrestarted) Lanczos method. Their cost scales at best linearly with respect to the input size but with a multiplicative factor, which depends quadratically on the number of eigenvectors sought. This becomes a major bottleneck when spectral clustering needs to be applied to large-scale datasets.

Frequency Response Analysis

Frequency response analysis is the quantitative measure of the output spectrum of a system or device in response to a stimulus, and is used to characterize the dynamics of the system. It is a measure of magnitude and phase of the output as a function of frequency, in comparison to the input. In simplest terms, if a sine wave is injected into a system at a given frequency, a linear system will respond at that same frequency with a certain magnitude and a certain phase angle relative to the input. A sinusoidal test signal may be used to measure points on the frequency response of a transfer function or impedance function.

Estimating the frequency response for a physical system generally involves exciting the system with an input signal, measuring both input and output time histories, and comparing the two through a process such as the Fast Fourier Transform (FFT). The frequency content of the input signal must cover the frequency range of interest because the results will not be valid for the portion of the frequency range not covered.

The frequency response of a system can be measured by applying a test signal, for example:
applying an impulse to the system and measuring its response (see impulse response);
sweeping a constant-amplitude pure tone through the bandwidth of interest and measuring the output level and phase shift relative to the input;
applying a signal with a wide frequency spectrum (for example multifrequency signals (nonorthogonal frequency-discrete multiplexing of signals (N-OFDM or as the same SEFDM) and OFDM), digitally-generated maximum length sequence noise, or analog filtered white noise equivalent, like pink noise), and calculating the impulse response by deconvolution of this input signal and the output signal of the system.

The frequency response is characterized by the magnitude of the system's response, typically measured in decibels (dB) or as a decimal, and the phase, measured in radians or degrees, versus frequency in radians/sec or Hertz (Hz). These response measurements can be plotted in three ways: by plotting the magnitude and phase measurements on two rectangular plots as functions of frequency to obtain a Bode plot; by plotting the magnitude and phase angle on a single polar plot with frequency as a parameter to obtain a Nyquist plot; or by plotting magnitude and phase on a single rectangular plot with frequency as a parameter to obtain a Nichols plot. For audio systems with nearly uniform time delay at all frequencies, the magnitude versus frequency portion of the Bode plot may be all that is of interest. For the design of control systems, any of the three types of plots (Bode, Nyquist, Nichols) can be used to infer closed-loop stability and stability margins (gain and phase margins) from the open-loop frequency response, provided that for the Bode analysis the phase-versus-frequency plot is included. The form of frequency response for digital systems (as example FFT filters) are periodical with multiple main lobes and sidelobes.

If the system under investigation is nonlinear, then applying purely linear frequency domain analysis will not reveal all the nonlinear characteristics. To overcome these limitations, generalized frequency response functions and nonlinear output frequency response functions have been defined that allow the user to analyze complex nonlinear dynamic effects. The nonlinear frequency response methods reveal complex resonance, inter modulation, and energy transfer effects that cannot be seen using a purely linear analysis and are becoming increasingly important in a nonlinear world.

One important field where frequency response analysis holds a prominent role is in structural mechanics where complex structures are modeled through Partial Differential Equations. Because of the high-cost of conventional approaches, partially stemming from large frequency intervals, it is imperative to use techniques which are more efficient in terms of memory consumption and wall-clock time requirements. One such approach is to perform a modal analysis instead, where the entire structure is projected (embedded) onto a lower-dimensional subspace capturing most of the energy of the problem. For example, an object might vibrate mostly along the modes corresponding to the few lowest frequencies, thus justifying the computation of only those eigenvectors associated with the lowest eigenvalues of the matrix pencil associated with a Finite Element discretization of the complex structure.

Computation of Eigenvectors

Both the spectral clustering analytic system and the frequency response analytic system (and other analytic systems) depend on determining and applying eigenvectors (outputs), of a large matrix pencil (input) that routinely appears in these types of analytic systems. Described herein is a system to determine and apply such eigenvalues/eigenvectors. The disclosed system allows for the practical computation and application of eigenvalues of matrices which may be so large they cannot fit in system memory.

Figure 2A:
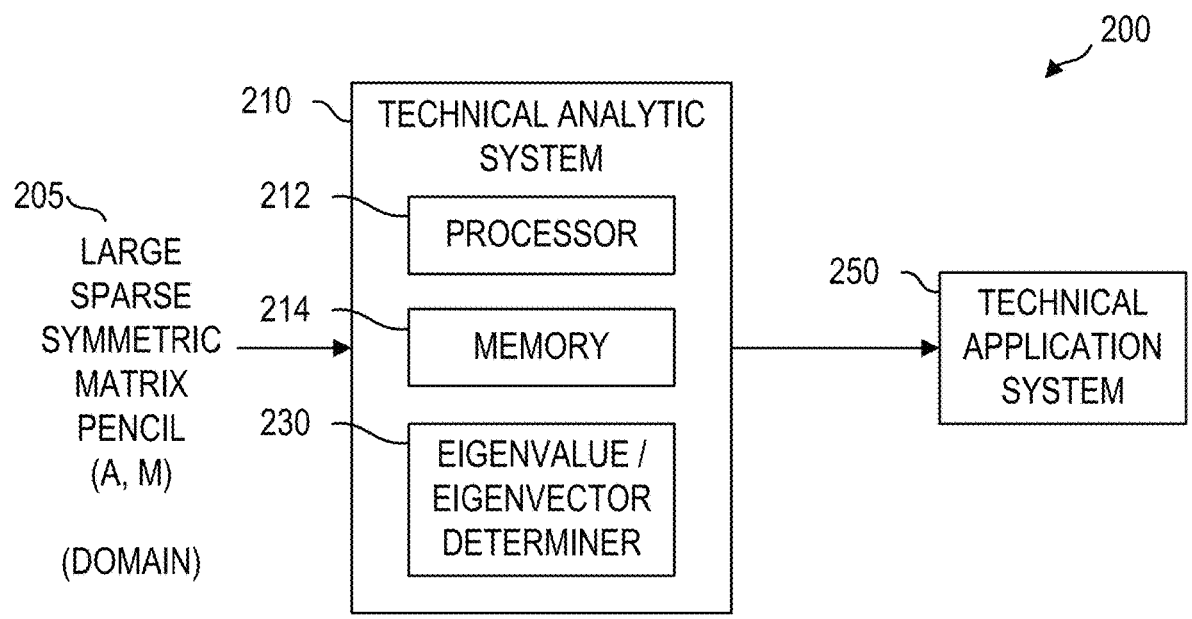
FIG. 2A is a block diagram illustrating a technical analytic system, according to some implementations.

FIG. 2A is a block diagram that illustrates the general concept of such a system 200 described above. The technical analytic system 210 described herein may be run on a DPS 10, and may comprise a processor 212 and memory 214 that may be used by an eigenvalue/eigenvector determiner 230 to execute various functions described herein. The technical analytic system 210 may utilize, as its input, a large sparse symmetric matrix pencil (A, M) 205 that is generated e.g., in a spectral clustering analysis system or a frequency response analysis system, as described above. Solving for the eigenvalues, eigenvectors, or eigenpairs of the matrix system allows an application to a technical application system 250, such as, e.g., one that uses a spectral clustering analysis as might be used, for example, in AI classification application, or in a technical application system 250 such as, e.g., one that uses a frequency response analysis as might be used, for example, response to an applied impulse signal, multifrequency signals (nonorthogonal frequency-discrete multiplexing of signals (N-OFDM or as the same SEFDM) and OFDM), impulse responses by deconvolution of the input signal and the output signal of the system, and audio analytic system, and a building structure analytic system.

The symmetric generalized eigenvalue problem is formally defined as:

$$Ax=\lambda Mx.$$

In general, for a matrix A, if there exists a vector x which is not all 0s and a scalar $\lambda$ such that $Ax=\lambda Mx$, then x is said to be an eigenvector of A with corresponding eigenvalue $\lambda$. The matrix A may be thought of as a function that maps vectors to new vectors. Most vectors will end up somewhere completely different when A is applied to them, but eigenvectors only change in magnitude. If one draws a line through the origin and the eigenvector, then after the mapping, the eigenvector would still land on the line. The amount which the vector is scaled along the line depends on $\lambda$. Eigenvectors help describe the dynamics of systems represented by matrices, including spectral clustering and frequency response analysis.

Graphs are a natural way to represent many types of data. A graph is a set of nodes with a corresponding set of edges which connect the nodes. The edges may be directed or undirected and can even have weights associated with them. For example, a network of routers on the internet can easily be represented as a graph. The routers are the nodes, and the edges are the connections between pairs of routers. Some routers might only allow traffic in one direction, so the edges could be directed to represent which direction traffic can flow. The weights on the edges could represent the bandwidth available along that edge. With this setup, one could then query the graph to find efficient paths for transmitting data from one router to another across the network.

Since spectral clustering requires the computation of the eigenvectors associated with a few smallest eigenvalues of a graph Laplacian matrix, given the large size of modern data collections, the eigenvector computation task can be extremely costly in terms of resources, such as processor bandwidth and memory.

Additionally, because of the large size of some of the structures undergoing frequency response analysis, solving the equation by classical approaches is extremely costly. An alternative is the modal superposition method, which requires the computation of eigenvectors associated with a large number of smallest eigenvalues.

The present system may be used to determine eigenvector derivatives of Schur complements in a novel manner. Known techniques, more importantly, give less accurate results than the technique disclosed herein and also require more memory.

Matrix Pencil

In linear algebra, if $A_0, A_1, \ldots, A_l$ are n×n complex matrices for some nonnegative integer I, and $A_l \neq 0$ (the zero matrix), then the matrix pencil of degree I is the matrix-valued function defined on the complex numbers $$L(\lambda) = \sum_{i=0}^{l} \lambda^i A_i.$$

A particular case is a linear matrix pencil A−λB with $\lambda \in \mathbb{C}$ (or $\mathbb{R}$) where A and B are complex (or real) n×n matrices. This is denoted briefly with the notation (A, B).

A pencil is called regular if there is at least one value of λ such that det(A−AB)≠0 Eigenvalues of a matrix pencil (A, B) are all complex numbers λ for which det(A−AB)=0 The set of the eigenvalues is called the spectrum of the pencil and is written σ(A, B). Moreover, the pencil is said to have one or more eigenvalues at infinity if B has one or more 0 eigenvalues.

The present disclosure concerns a Rayleigh-Ritz projection scheme to determine a selected number of eigenvalues (and, optionally, associated eigenvectors) of large and sparse symmetric pencils. This represents an improvement over the traditional shift-and-invert Lanczos method previously used. The focus lies in the determination of a few eigenvalues located immediately on the right (or left) of some real scalar, and the proposed technique is the more effective when a large number of eigenvalues/eigenvectors are sought. Such eigenvalue problems appear in applications such as low-frequency response analysis and spectral clustering, among others.

Determining eigenvalues located the closest to a given scalar is typically achieved by enhancing the projection method of choice by shift-and-invert. When the required accuracy in the approximation of the sought eigenvalues is not high, an alternative to shift-and-invert is the Automated Multilevel Substructuring (AMLS) technique. AMLS builds a large projection subspace while avoiding excessive orthogonalization costs and can be considerably faster than shift-and-invert Krylov subspace techniques in applications where a large number of eigenvalues are sought.

Process Flow

Figure 3:
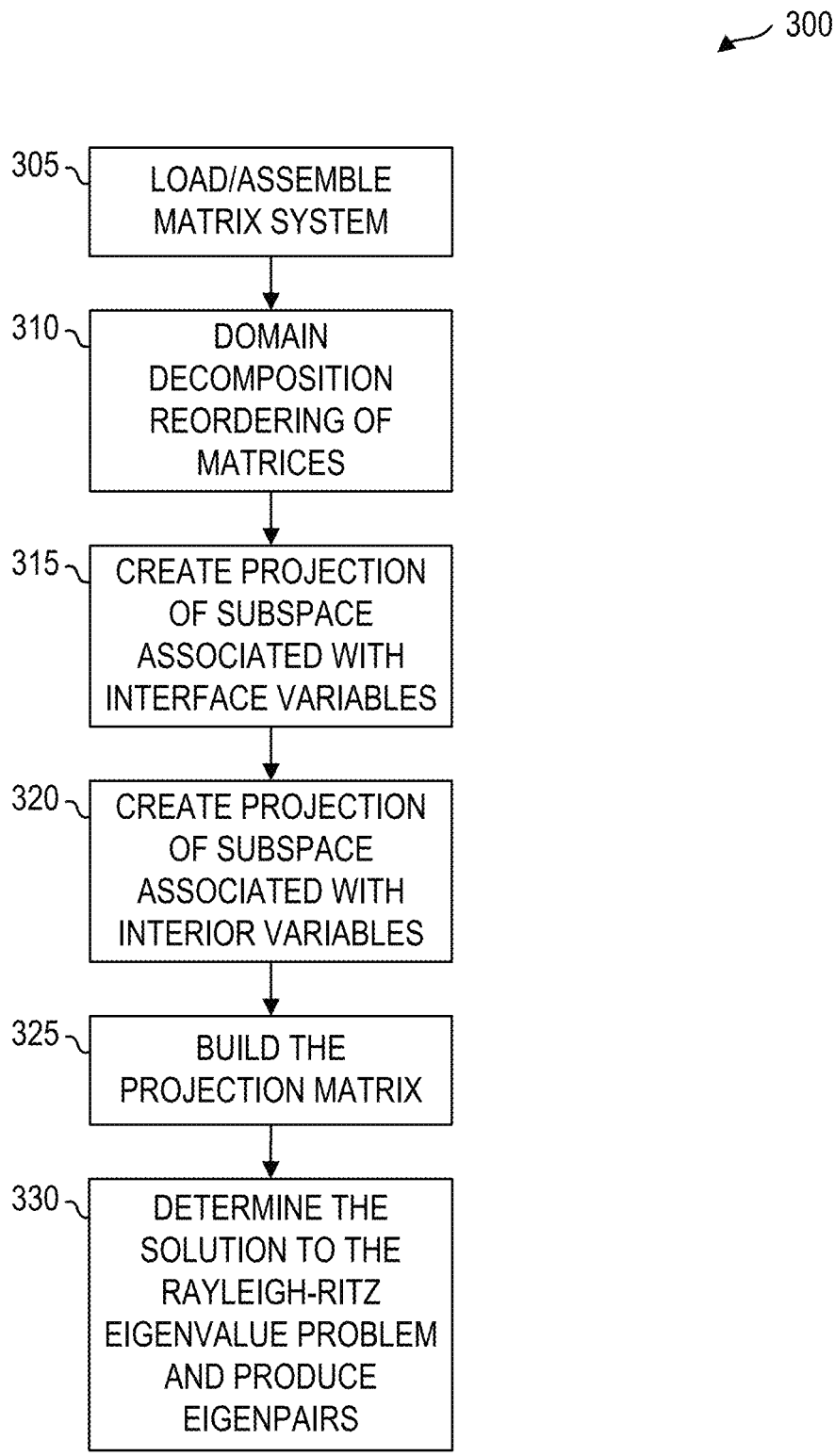
FIG. 3 is a flowchart illustrating a process used herein, according to some implementations.

FIG. 3 is a flowchart that illustrates a process 300 for finding eigenpairs (eigenvalues, eigenvectors) according to some embodiments.

Figure 2B:
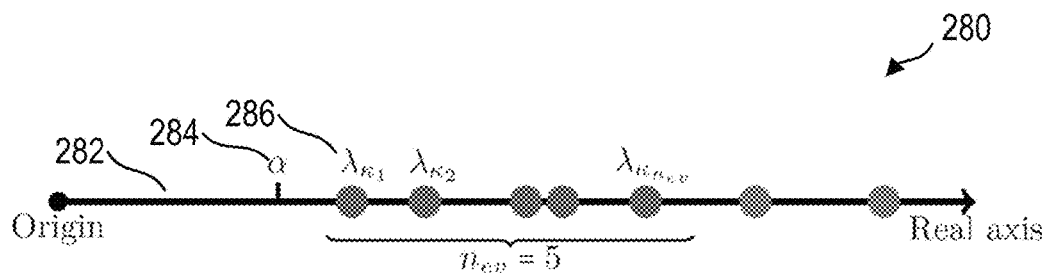
FIG. 2B is a graph illustrating eigenvalue solutions adjacent to a value a that are being sought, according to some implementations.
Figure 2C:
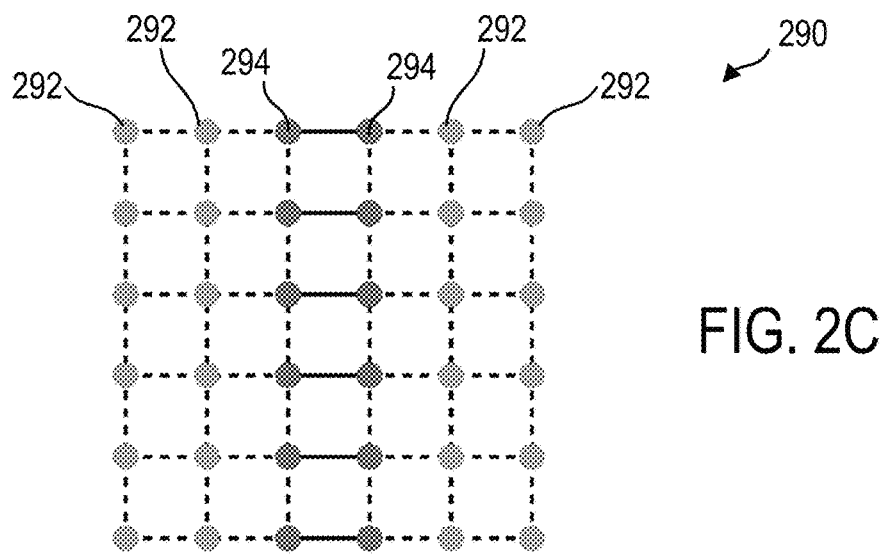
FIG. 2C is a pictorial representation illustrating nodes interior vs. interface nodes in an adjacency graph, according to some implementations.

In operation 305, the technical analytic system 210 may load/assemble the matrix system, e.g., the large sparse symmetric matrix pencil (A, M) 205, which constitutes the domain. The present focus here assumes that matrices A and M are symmetric, and M is a symmetric positive definite (SPD) matrix. The matrix pencil (A, M) 205 has n eigenpairs, denoted here by $(\lambda_i, x^{(i)})$, i=1, . . . , n, where $\lambda_i$ constitute eigenvalues, and $x^{(i)}$ constitute eigenvectors. Of interest is the determination of specified $n_{ev}$ eigenpairs for matrix pencil (A, M) 205, which are located immediately on the right (or left) of some scalar $\alpha \in \mathbb{R}$. FIG. 2B illustrates the set of real numbers R 280 showing the real axis 282 and the scalar α 284, and the eigenvalues $\lambda_i$ 286. FIG. 2C illustrates a graph 290 comprising interior nodes 292 within partitions, and interface nodes 294 between partitions.

The loading/assembling of the matrix system includes inputting the matrices A and M, the scalars $n_{ev}$, which is the number of eigenpairs to determine, and α, which is a scalar value from which the eigenvalues are sought. It also includes inputting a number of partitions p, and a number of local modes computing from each substructure (parition).

The standard approach to compute a few eigenpairs of sparse and symmetric matrix pencils is by applying the Rayleigh-Ritz technique onto some carefully constructed subspace $\mathcal{Z}$ of $\mathbb{R}^n$. The goal is to find a subspace $\mathcal{Z}$ that includes an invariant subspace associated with the $n_{ev}$ sought eigenvalues $\lambda_1, \ldots, \lambda_{n_{ev}}$. The sought eigenpairs can then be identified (in the absence of roundoff errors) as a subset of the Ritz pairs of the matrix pencil $(Z^T AZ\ Z^T MZ)$, where the matrix Z represents a basis of the subspace $\mathcal{Z}$.

The matrices $$A = \begin{pmatrix} B_1 & & & & E_1 \\ & B_2 & & & E_2 \\ & & \ddots & & \vdots \\ & & & B_P & E_P \\ E_1^T & E_2^T & \cdots & E_P^T & C \end{pmatrix},$$

$$M = \begin{pmatrix} M_B^{(1)} & & & & M_E^{(1)} \\ & M_B^{(2)} & & & M_E^{(2)} \\ & & \ddots & & \vdots \\ & & & M_B^{(p)} & M_E^{(p)} \\ \left(M_E^{(1)}\right)^T & \left(M_E^{(2)}\right)^T & \cdots & \left(M_E^{(p)}\right)^T & M_C \end{pmatrix}$$

may be written in a 2×2 block form:

$$A = \begin{pmatrix} B & E \\ E^T & C \end{pmatrix},$$

$$M = \begin{pmatrix} M_B & M_E \\ M_E^T & M_C \end{pmatrix},$$

where B and $M_B$ are square matrices of size d×d, E and $M_E$ are rectangular matrices of size d×s, C and $M_C$ are square matrices of size s×s, n−d+s, and $s \geq n_{ev}$. Similarly, the eigenvector $x^{(i)}$ associated with eigenvalue $\lambda_i$ may be rewritten in a 2×1 block form $$x^{(i)} = \begin{pmatrix} u^{(i)} \\ y^{(i)} \end{pmatrix} = \begin{pmatrix} u_1^{(i)} \\ \vdots \\ u_p^{(i)} \\ y_1^{(i)} \\ \vdots \\ y_p^{(i)} \end{pmatrix}.$$

$Ax^{(i)} = \lambda_i Mx^{(i)}$ using the block form gives $$(A - \lambda_i M)x^{(i)} = \begin{pmatrix} B - \lambda_i M_B & E - \lambda_i M_E \\ E^T - \lambda_i M_E^T & C - \lambda_i M_C \end{pmatrix} \begin{pmatrix} u^{(i)} \\ y^{(i)} \end{pmatrix} = 0.$$

Eliminating u(i) from the second row equation leads to the s×s nonlinear eigenvalue problem $$\underbrace{[C - \lambda_i M_C - (E - \lambda_i M_E)^T (B - \lambda_i M_B)^{-1} (E - \lambda_i M_E)]}_{S(\cdot)} y^{(i)} = 0,$$

$$u^{(i)} = -\underbrace{(B - \lambda_i M_B)^{-1}}_{\text{block-diagonal}} (E - \lambda_i M_E) y^{(i)},$$

from which the eigenpair can be determined. The missing d×1 part of $x^{(i)}$, $u^{(i)}$ is then recovered by solving the linear system $$(B - \lambda_i M_B) u^{(i)} = -(E - \lambda_i M_E) y^{(i)}.$$

From a domain decomposition perspective, an ideal choice is to set $\mathcal{Z} = u \oplus y$, and perform a Rayleigh-Ritz projection onto this subspace, where $$y = \text{span}\{y^{(i)}\}_{i=1,\ldots,n_{ev}},$$

$$u = \text{span}\{-(B - \lambda_i M_B)^{-1}(E - \lambda_i M_E) y^{(i)}\}_{i=1,\ldots,n_{ev}}.$$

The main goal of algebraic domain decomposition eigenvalue solvers is to build a projection subspace which, ideally, includes the subspace Z.

Domain Decomposition (Partitioning) into Subdomains and Reordering of Matrices

Figure 2D:
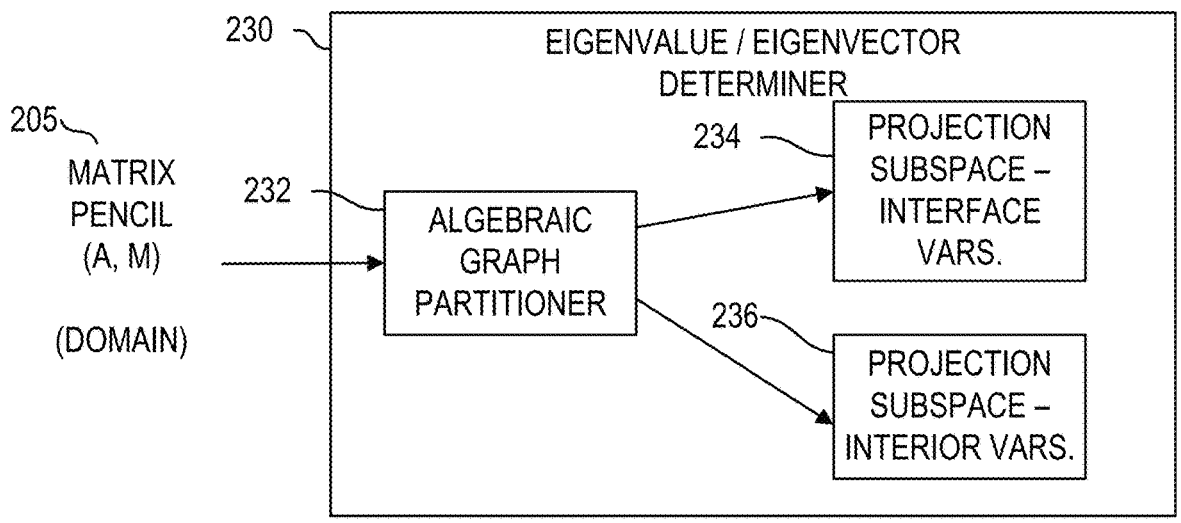
FIG. 2D is a block diagram illustrating an eigenvalue/eigenvector determiner, according to some implementations.

The first operation performed on the matrix pencil (A, M) 205, referring to FIG. 2D, is having the eigenvalue/eigenvector determiner 230 performing a domain decomposition (partitioning) into subdomains and reordering the matrices, in operation 310. A graph associated with a given matrix pencil may be partitioned into a number of non-overlapping subdomains with the help of an algebraic graph partitioner 232. The projection subspace may have interface variables 234 and interior variables 236.

Practical applications of algebraic domain decomposition eigenvalue solvers rely on relabeling the unknowns/equations of the eigenvalue problem Ax=λMx such that matrices B−λ$M_B$ and E−λ$M_E$ are block-diagonal. This can be easily achieved by applying a graph partitioner to the adjacency graph of the matrix |A|+|M|. In this disclosure, only p-way partitionings are considered, and the partitioner divides the graph into p>1 non-overlapping subdomains. The rows/columns of matrices A and M are then reordered so that unknowns/equations associated with interior variables (i.e., nodes of the adjacency graph which are connected only to nodes located in the same partition) are listed before those associated with interface variables (i.e., nodes of the adjacency graph which are connected with nodes located in neighboring partitions). The sought eigenpairs of the original pencil are then approximated by a Rayleigh-Ritz projection on a subspace formed by the direct sum of the subspaces associated with the two different types of variables.

Algebraic Domain Decomposition

This disclosure focuses on algebraic domain decomposition eigenvalue solvers where the concept of domain decomposition is applied directly to the eigenvalue equation. The main challenge of algebraic domain decomposition eigenvalue solvers is the construction of the interface projection subspace due to the non-linear nature of the interface matrix operator, also known as "spectral Schur complement".

In linear algebra and the theory of matrices, the Schur complement of a block matrix is defined as follows. Suppose A, B, C, D are respectively p×p, p×q, q×p, and q×q matrices, and D is invertible. Let $$M = \begin{bmatrix} A & B \\ C & D \end{bmatrix}$$

so that M is a (p+q)×(p+q) matrix.

Then the Schur complement of the block D of the matrix M is the p×p matrix defined by $$M/D := A - BD^{-1}C$$

and, if A is invertible, the Schur complement of the block A of the matrix M is the q×q matrix defined by $$M/A := C - CA^{-1}B.$$

In the case that A or D is singular, substituting a generalized inverse for the inverses on M/A and M/D yields the generalized Schur complement.

AMLS, an alternate technique to that focused on here, can be seen as building this subspace by computing a few of the eigenvectors of the linear generalized eigenvalue problem stemming by a first-order truncation of the Taylor series of the spectral Schur complement expanded around some real shift. As a result, the accuracy provided by AMLS might deteriorate considerably as one moves further away from the chosen shift. An alternative suggested is to form the interface projection subspaces by considering a complex rational transformation to the original pencil which damps the interface components of those eigenvectors associated with unwanted eigenvalues. While these techniques can indeed lead to enhanced accuracy, they also require multiple matrix factorizations computed in complex arithmetic, which is processor intensive.

The algorithm disclosed herein may: a) preserve the advantages of algebraic domain decomposition eigenvalue solvers, such as reduced orthogonalization costs and inherent parallelism, while, at the same time, b) increase their accuracy without considering more than one shift. Numerical experiments have demonstrated the efficiency of the proposed technique on sequential/distributed memory architectures as well as its competitiveness against schemes such as shift-and-invert Lanczos, and AMLS combined with p-way vertex-based partitionings.

Method Characteristics

Primary characteristics of the method include: 1) zeroth-order truncation of the interface matrix operator; 2) exploiting Taylor series expansions of interface eigenvectors; and 3) reduced orthogonalization costs and enhanced parallelism. These are summarized below.

Zeroth-Order Truncation of the Interface Matrix Operator

In contrast to AMLS, the algorithm disclosed herein only considers a zeroth-order truncation of the spectral Schur complement (the interface matrix operator), i.e., there is only a need to partially solve a standard eigenvalue problem to generate the interface projection subspace 234. This approach avoids the need to compute/apply the derivative of the spectral Schur complement, as AMLS does.

Exploiting Taylor Series Expansions of Interface Eigenvectors

The accuracy of the interface projection subspace is enhanced by expanding the (analytic) eigenvectors of the spectral Schur complement through their Taylor series, and injecting a few leading eigenvector derivatives into the subspace. It is shown theoretically, and verified experimentally, that injecting up to second leading eigenvector derivatives leads to eigenvalue approximation errors of up to quartic order. These eigenvector derivatives are computed independently of each other by exploiting deflated Krylov subspace solvers. Several details are discussed, and bounds on the effective condition numbers are given.

Reduced Orthogonalization Costs and Enhanced Parallelism

Similarly to domain decomposition schemes such as AMLS and RF-DDES, orthonormalization is only applied to vectors whose length is equal to the number of interface variables instead of the entire set of domain variables (e.g., as in shift-and-invert Lanczos). This becomes important when both a large number of eigenvalues is sought and the number of interface variables is much smaller compared to the total number of equations/unknowns.

In addition, the projection subspace associated with the interior variables of each subdomain is built independently of each other (and thus trivially parallel) by computing local eigenmodes and computing up to second-order resolvent expansions. Details on the expected accuracy of the eigenvalue approximations are presented.

In operation 310, the operation creates a projection of a subspace associated with the interface variable 234. Typically, this is the bottleneck, i.e., the formation of y=span $\{y^{(i)}\}_{i=1,\ldots,n_{ev}}$. In the AMLS procedure, the following operations occur:

Approximate $S(\lambda)$ by $(S(\sigma), -S'(\sigma))$ for some $\sigma \in \mathbb{R}$.
Approximate span $\{y^{(i)}\}_{i=1,\ldots,n_{ev}}$ by span $\{\hat{y}_i(\sigma)\}_{i=1,\ldots,\gamma n_{ev}}$
where $\hat{y}_i$ is the ith eigenvector of $(S(\sigma), -S'(\sigma))$.

This approach has the advantages of parallelism, and orthogonalization costs, but it suffers in terms of accuracy. The approach considered herein:

Approximate $S(\lambda)$ by $S(\sigma)$ for some $\sigma \in \mathbb{R}$.
Approximate span $\{y^{(1)}\}_{i=1,\ldots,n_{ev}}$ by span $\{y_i(\sigma), dy_i(\sigma), d^2 y_i(\sigma)\ldots\}_{i=1,\ldots,\gamma n_{ev}}$,
where $y_i$ is the ith eigenvector of $S(\sigma)$.

This approach also has the advantages of parallelism, and orthogonalization costs, and it is derivative-free, and may yield greater accuracy, although it may or may not reduce computational cost.

In operation 315, a subspace projection is created that is associated with the interface variables, and takes $\alpha$ and $n_{ev}$ as inputs. Operation 315 comprises two primary suboperations: sub-operation (1) solving $S(\alpha)y(\alpha) = \mu(\alpha)y(\alpha)$ for the $n_{ev}$ smallest positive eigenvalues $\mu(\alpha)$ and associated eigenvectors $y(\alpha)$—these eigenpairs may be denoted as $(\mu_{\psi_i}(\alpha), y_{\psi_i}(\alpha))$, i=1, ..., $n_{ev}$; and sub-operation (2) forming $Y = [y_{\psi_1}(\alpha), y_{\psi_1}'(\alpha), y_{\psi_1}''(\alpha), \ldots y_{\psi_2}(\alpha), y_{\psi_2}'(\alpha), y_{\psi_2}''(\alpha), \ldots]$ The computation of $d^\theta y_{\psi_i}(\alpha)$ requires a linear system solution with matrix $S(\alpha) - \mu_{\psi_i}(\alpha)I$. It is possible to take advantage of the computed eigenvectors of $S(\alpha)$ (deflation). Computing more than one or two leading derivatives is rather impractical.

Figure 2E:
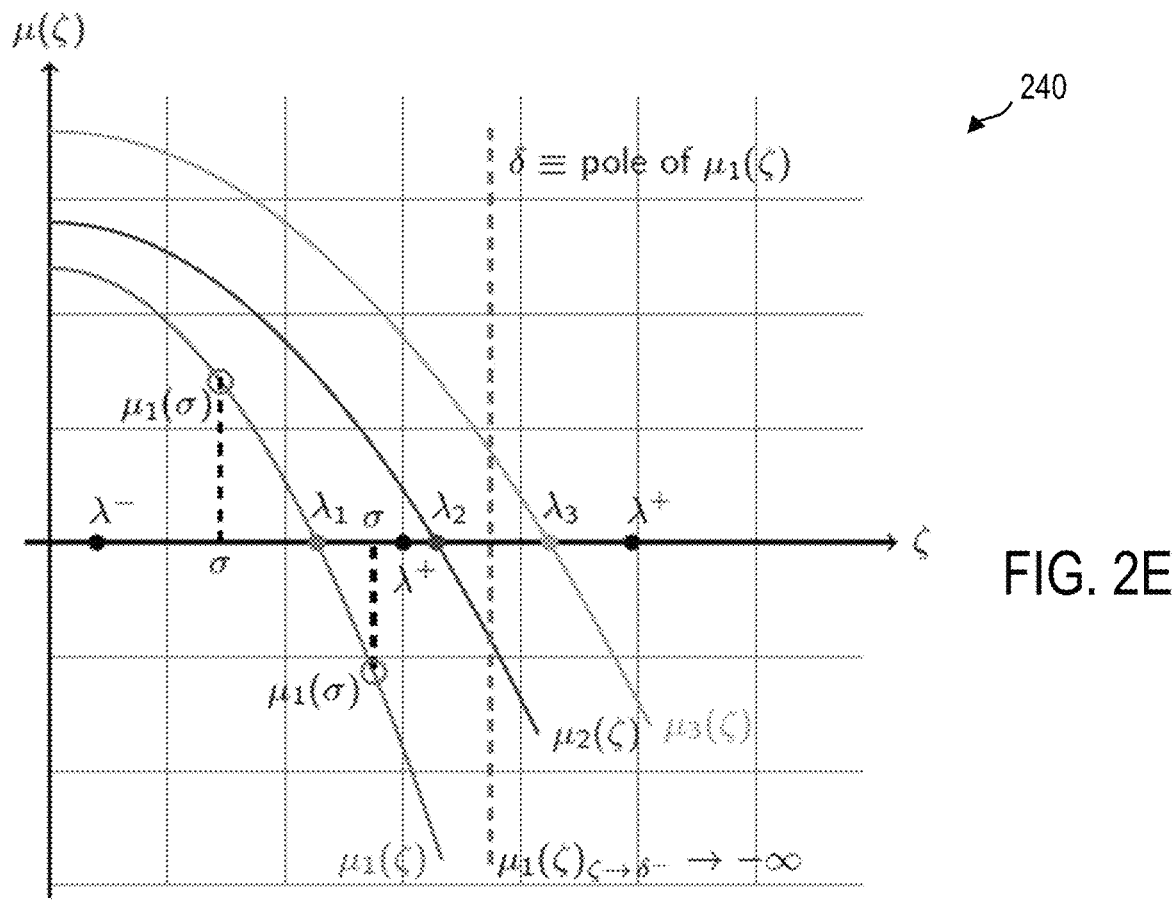
FIGS. 2E and 2F are graphs illustrating eigenvalue curves in a subdomain of their domain of definition.

FIG. 2E is a graph 240 that illustrates the elements within suboperation (1) of operation 315 of utilizing truncated spectral Schur complements. Let $\mu_j(\zeta)$ denote the $j^{th}$ eigenvalue of the matrix. Then:

$$S(\zeta) = C - \zeta M_C - \sum_{i=1}^{d} \frac{(E - \zeta M_E)^T v_i v_i^T (E - \zeta M_E)}{\delta_i - \zeta},$$

where $(\delta_i)$ denotes the $i^{th}$ eigenpair of $(B, M_B)$. The eigenvalues $\delta_i \in \Lambda(B, M_B)$ are poles of $S(\zeta)$, and the eigenvalue curves are analytic except at their poles.

Assuming now that $\mu_j(\Lambda) = 0$ where j is known, and let $\sigma \in \mathbb{R}$ such that $\sigma \in [\lambda^-, \lambda^+]$ includes only the root of $\lambda$ of $\mu_j(.)$. Ideally, $\mu_j(\sigma) = 0$, i.e., $\sigma \equiv \lambda$ and $y_j(\lambda)$ is an eigenvector of $S(\zeta)y = 0$. However, in practice, it may or may not be true that $\sigma \approx \lambda$, so the focus is on how to improve upon the span $\{y_j(\sigma)\}$.

Expanding $y_j(\sigma)$ through its Taylor series around $\sigma$ gives:

$$y_j(\lambda) = \sum_{i=0}^{\infty} \frac{(\lambda - \sigma)^i}{i!} \left(\frac{d^i y_j(\zeta)}{d\zeta^i}\right)_{\zeta=\sigma}.$$

The eigenvector x associated with $\lambda$ may be written as $$x = \begin{pmatrix} -(B - \lambda M_B)^{-1}(E - \lambda M_E) y_j(\lambda) \\ y_j(\lambda) \end{pmatrix} =$$

$$\begin{pmatrix} -(B - \lambda M_B)^{-1}(E - \lambda M_E) \left[\sum_{i=0}^{\infty} \frac{(\lambda - \sigma)^i}{i!} \left(\frac{d^i y_j(\zeta)}{d\zeta^i}\right)_{\zeta=\sigma}\right] \\ \sum_{i=0}^{\infty} \frac{(\lambda - \sigma)^i}{i!} \left(\frac{d^i y_j(\zeta)}{d\zeta^i}\right)_{\zeta=\sigma} \end{pmatrix}.$$

Figure 2F:
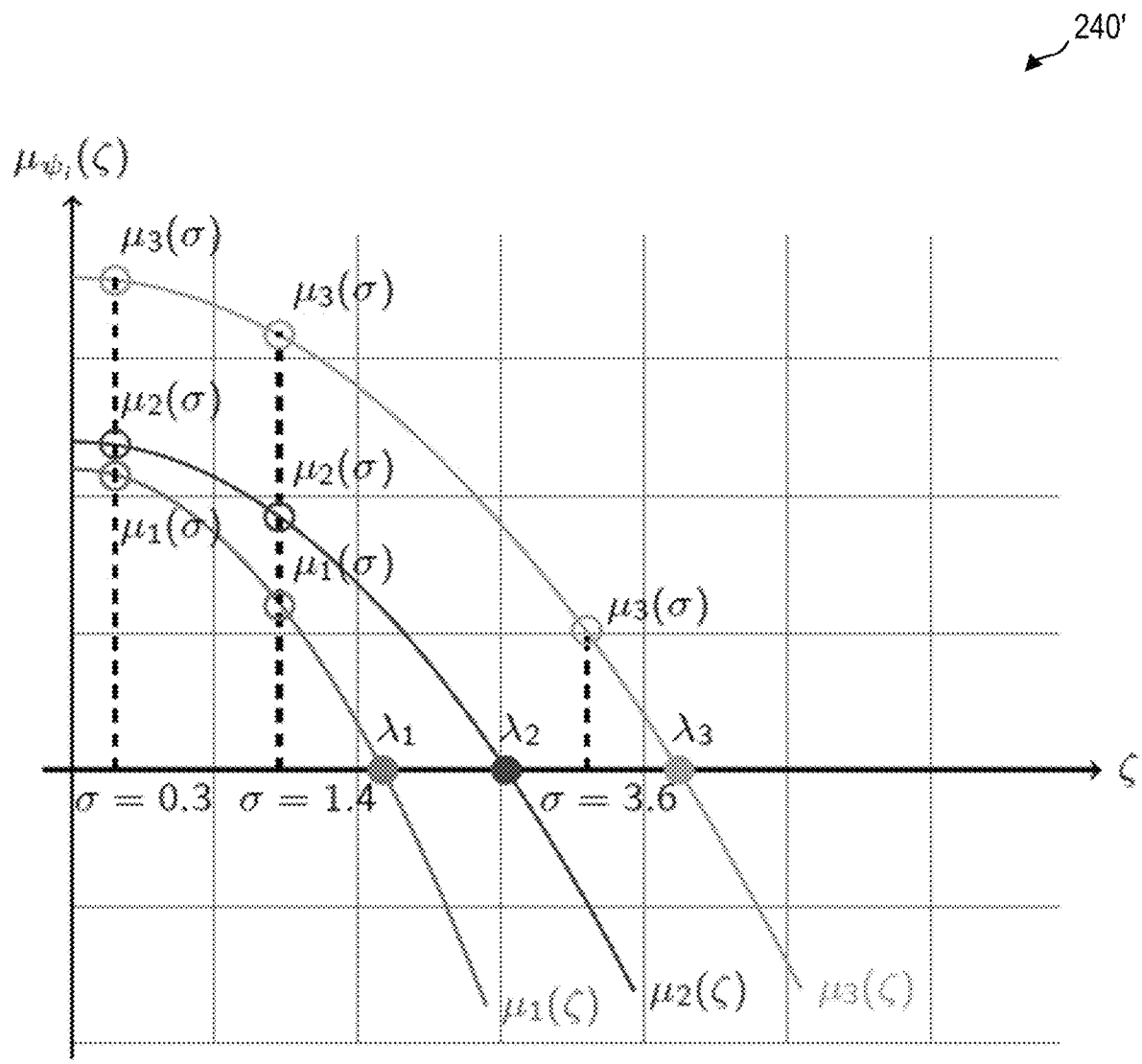

Referring to the graph 240' in FIG. 2F, the above discussion omits several practical details, including: a) it assumes $\lambda$ is known; b) it assumes the subscript j for which $\mu_j(\lambda) = 0$ is known; and c) it requires formulas to approximate y, dy, $d^2 y$, .... In practice, it is expected that consecutive eigenvalue curves will cross the real axis at consecutive $\lambda \in \Lambda(A, M)$. Thus the algorithm needs to compute only the $n_{ev}$ eigenvalue curves associated with the $n_{ev}$ smallest non-negative eigenvalues of $S(\alpha)$.

Operation 320 creates a projection of the subspace associated with the interior variables. The main idea here is to write $B_\lambda^{-1} = B\sigma^{-1} \sum_{i=0}^{p} [(\lambda - \sigma) M_B B\sigma^{-1}]^i$ and retain a first-order approximation plus eigenvectors located the closest to $\sigma$. Combining $p \geq 1$ with $\mu = 1$, it can be shown that $|\lambda - \hat{\lambda}| = O((\lambda - \sigma)^\chi)$, where $\chi = \min\{4.2(\tau+1) \cdot \tau + 3\}$.

The operation takes as input, $\sigma := \alpha$, $\kappa$, and Y:=orthonormal basis returned by the previous (interface variables) algorithm. It then loops for j=1, ..., p:

$V_j = \text{eigs}(B_\alpha^{(j)}, M_B^{(j)}, \kappa, sm)(B_\alpha^{(j)} = B_j - \alpha M_B^{(j)})$.

It then forms:

$$U = [\overline{U}^{(1)}, \ldots, \overline{U}^{(p)}, -B_\alpha^{-1} E_\alpha Y, -B_\alpha^{-1} M_B B_\alpha^{-1} E_\alpha Y, B_\alpha^{-1} M_E Y],$$

$$\overline{U}^{(j)} = \begin{pmatrix} 0_{l_j, \kappa} \\ V_j \\ 0_{v_j, \kappa} \end{pmatrix}.$$

Next, in operation 325, the projection matrix Z is built for the Rayleigh-Ritz eigenvalue problem as follows. The matrix Y returned from operation 315 is distributed among the p subdomains, and can be written as $Y = [Y_1^T Y_2^T \ldots Y_p^T]T$ where $Y_j \in \mathbb{R}^{s_j \times \eta}$ is the row block of matrix Y associated with the $j^{th}$ subdomain, and $\eta \in \mathcal{Z}^*$ denotes the column dimension of matrix Y. By definition, $\eta$ is equal to an integer multiple of $n_{ev}$. The following matrices are defined:

$$(\hat{B}_\alpha^{(j)})^{-1} = (B_\alpha^{(j)})^{-1}(I - V_j V_j^T M_B^{(j)}), \text{ and}$$

$$P_j = [E_\alpha^{(j)}, -M_E^{(j)}]\begin{pmatrix} Y_j & 0 \\ 0 & Y_j \end{pmatrix}.$$

The projection matrix z can then be written as:

$$Z = \begin{bmatrix} V_1 & & & -(\hat{B}_\alpha^{(1)})^{-1}P_1 & -\left(B_\alpha^{(1)}(M_B^{(1)})^{-1}\hat{B}_\alpha^{(1)}\right)^{-1}E_\alpha^{(1)}Y_1 \\ & V_2 & & -(\hat{B}_\alpha^{(2)})^{-1}P_2 & -\left(B_\alpha^{(2)}(M_B^{(2)})^{-1}\hat{B}_\alpha^{(2)}\right)^{-1}E_\alpha^{(2)}Y_2 \\ & & \ddots & \vdots & \vdots \\ & & & V_p & -(\hat{B}_\alpha^{(p)})^{-1}P_p & -\left(B_\alpha^{(p)}(M_B^{(p)})^{-1}\hat{B}_\alpha^{(p)}\right)^{-1}E_\alpha^{(p)}Y_p \\ & & & [Y, 0_{s,\eta}] & \end{bmatrix}.$$

The total memory overhead associated with the $j^{th}$ subdomain is equal to that of storing $\kappa d_i + (3d_i + s_i)\eta$ floating-point scalars. The dimension of the Rayleigh-Ritz pencil ($Z^T$ AZ, $Z^T$ MZ) is equal to $\kappa p + 3\eta$ and can be solved by the appropriate routine in LAPACK, e.g., dsygv. When $M_E^{(j)}=0$, $P_j = E_\alpha^{(j)} Y_j$, and the bottom row-block of matrix Z becomes $[0_{s,p\kappa}, Y, 0_{s,\eta}]$. The dimension of that Rayleight-Ritz pencil then reduces to $\kappa p + 2\eta$.

Finally, in operation 330, the Rayleigh-Ritz eigenvalue problem is solved by solving:

$$(Z^T A Z)\tilde{x} = \tilde{\lambda}(Z^T M Z)\tilde{x}$$

for the $n_{ev}$ sought $(\tilde{\lambda}, \tilde{x})$.

The following compares the presently disclosed algorithm with the shift-and-invert Lanczos when the latter is applied directly to the pencil (A—αM, M).

The first difference between these two techniques is orthogonalization cost. Applying k steps of shift-and-invert Lanczos to matrix pencils (S(α), I) and (A—aM, M) leads to a total orthogonalization cost of $O(k^2 s)$ and $O(k^2 n)$, respectively. Thus, the present algorithm reduces orthogonalization costs by a factor of n/s, and this difference becomes more pronounced as $n_{ev}$ increases (since $k \geq n_{ev}$). The second difference between the present algorithm and shift-and-invert Lanczos is the number of linear system solutions with matrix $B_\alpha$. It is straightforward to verify that applying k steps of shift-and-invert Lanczos to the pencil (A—aM, M) requires 2k such linear system solutions. In contrast, the present algorithm requires $3\eta$ ($2\eta$ if $M_E=0$) linear solves with $B_\alpha$. Nonetheless, those $3\eta$ linear solves with matrix $B_\alpha$ may be performed simultaneously, since all right-hand sides are available at the same time. Thus, the associated cost can be marginally higher than that of solving for a few right-hand sides.

To the above cost one also adds the computational cost required to compute the eigenvectors of the block-diagonal pencil ($B_\alpha$, $M_B$) in the present algorithm. On the other hand, the accuracy achieved by shift-and-invert Lanczos applied directly to pencil (A—aM, M) can be significantly higher than that of the present algorithm. Nonetheless, in many applications, the sought eigenpairs are not required up to a very high accuracy, e.g., eigenvalue problems originating from discretizations need be solved up to the associated discretization error.

The present algorithm is based on domain decomposition and is thus well-suited for execution in modern distributed memory environments. For example, each one of the p subdomains can be mapped to a separate message passing interface (MPI) process.

Performing any type of operations with the block-diagonal matrices $B_\alpha^{(j)}$, $E_\alpha^{(j)}$, and $M_E^{(j)}$ is then an entirely local process in the $j^{th}$ subdomain (i.e., creating the projection of the subspace associated with the interior variables in operation 320 is extremely parallel). An additional layer of parallelism is possible in each subdomain by further exploiting shared memory parallelism to perform the required computations with the aforementioned matrices.

In contrast to operation 320, operation 312 involves computations with the Schur complement matrix S(α), which is distributed among the p subdomains. In this case, point-to-point communication among neighboring subdomains is necessary. Finally, the Rayleigh-Ritz eigenvalue problem is typically small enough so that it can be replicated in all MPI processes and solved redundantly.

A detailed application of the eigenvectors of the pencil (A,M) computed by the present system on spectral clustering is as follows. Let A denote the graph Laplacian matrix of an undirected graph and M be a diagonal matrix where its $i^{th}$ diagonal entry holds the degree of the $i^{th}$ vertex of the graph. Now let $x^{(1)}, x^{(2)}, \ldots, x^{(k)}$, denote the eigenvectors associated with the k algebraically smallest eigenvalues of the pencil (A,M), and let the columns of matrix X be equal to the k computed eigenvectors $x^{(1)}, x^{(2)}, \ldots, x^{(k)}$. Now let $x_i$ denote the $i^{th}$ row of matrix X. The final step of spectral clustering is to call a clustering algorithm (e.g., k-means) to partition the k-dimensional points determined by the rows of matrix X into a user-given number of clusters.

Technical Application

The one or more embodiments disclosed herein accordingly provide an improvement to computer technology. For example, an improvement to an analytical computer that is able to efficiently solve the eigenvalue/eigenvector problem for large and sparce symmetric matrix pencils provides a technical advantage in terms of computer resources, such as processor cycles and memory.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of utilizing a computing device to solve for eigenvalues of a matrix system, the method comprising, using a processor of the computing device:
    loading the matrix system into a memory of the computing device;
    performing a domain decomposition into non-overlapping subdomains and a reordering of matrices of the matrix system;
    creating an interface variable projection subspace associated with interface variables of an adjacency graph of the matrix system, wherein the interface variables are related to nodes of the adjacency graph which are connected with nodes located in neighboring partitions;
    creating an internal variable projection subspace associated with internal variables of the adjacency graph of the matrix system, wherein the internal variables are related to nodes of the adjacency graph which are connected only to nodes located in the same partition;
    building a projection matrix based on the interface variable projection subspace and the internal variable projection subspace;
    determining eigenvalues that solve a Raleigh-Ritz eigenvalue problem utilizing the projection matrix; and
    utilizing the determined eigenvalues in a technical application system.

2. The method of claim 1, wherein the technical application system is selected from the group consisting of a clustering analytic system and a frequency response analytic system.

3. The method of claim 2, wherein the clustering analytic system is an artificial intelligence (AI) classification system, and the frequency response analytic system is selected from the group consisting of an audio analytic system and a building structure analytic system.

4. The method of claim 1, wherein creating an interface variable projection subspace associated with interface variables utilizes a zeroth-order truncation of a spectral Schur complement and avoids computation of a derivative of the spectral Schur complement.

5. The method of claim 1, wherein the creating of the interface variable projection subspace associated with interface variables comprises:
   expanding analytic eigenvectors of the spectral Schur complement through their Taylor series; and
   injecting leading eigenvector derivatives into the interface projection subspace.

6. The method of claim 1, wherein the matrix system is a large sparse symmetric matrix pencil (A, M) comprising matrix A and matrix M, the matrix pencil constituting a domain of the matrix system.

7. The method of claim 6, wherein:
   matrix A and matrix M are symmetric; and
   matrix M is a symmetric positive definite matrix.

8. The method of claim 6, wherein the performing of the domain decomposition utilizes an algebraic graph partitioner on an adjacency graph associated with the matrix system.

9. The method of claim 1, further comprising:
   determining eigenvectors associated with respective eigenvalues to form eigenpairs; and
   utilizing the eigenpairs in the technical application system.

10. An apparatus for a technical analytical system, comprising:
    a memory; and
    a processor that is configured for:
      loading a matrix system into the memory;
      performing a domain decomposition into non-overlapping subdomains and a reordering of matrices of the matrix system;
      creating an interface variable projection subspace associated with interface variables of an adjacency graph of the matrix system, wherein the interface variables are related to nodes of the adjacency graph which are connected with nodes located in neighboring partitions;
      creating an internal variable projection subspace associated with internal variables of the adjacency graph of the matrix system, wherein the internal variables are related to nodes of the adjacency graph which are connected only to nodes located in the same partition;
      building a projection matrix based on the interface variable projection subspace and the internal variable projection subspace;
      determining eigenvalues that solve a Raleigh-Ritz eigenvalue problem utilizing the projection matrix; and
      utilizing the determined eigenvalues in a technical application system.

11. The apparatus of claim 10, wherein the technical application system is selected from the group consisting of a clustering analytic system and a frequency response analytic system.

12. The apparatus of claim 11, wherein the clustering analytic system is an artificial intelligence (AI) classification system, and the frequency response analytic system is selected from the group consisting of an audio analytic system and a building structure analytic system.

13. The apparatus of claim 10, wherein creating an interface variable projection subspace associated with interface variables utilizes a zeroth-order truncation of a spectral Schur complement and avoids computation of a derivative of the spectral Schur complement.

14. The apparatus of claim 10, wherein the creating of the interface variable projection subspace associated with interface variables comprises:
    expanding analytic eigenvectors of the spectral Schur complement through their Taylor series; and
    injecting leading eigenvector derivatives into the interface projection subspace.

15. The apparatus of claim 10, wherein the matrix system is a large sparse symmetric matrix pencil (A, M) comprising matrix A and matrix M, the matrix pencil constituting a domain of the matrix system.

16. The apparatus of claim 15, wherein:
    matrix A and matrix M are symmetric; and
    matrix M is a symmetric positive definite matrix.

17. The apparatus of claim 15, wherein the performing of the domain decomposition utilizes an algebraic graph partitioner on an adjacency graph associated with the matrix system.

18. The apparatus of claim 10, wherein the processor is further configured for:
    determining eigenvectors associated with respective eigenvalues to form eigenpairs; and
    utilizing the eigenpairs in the technical application system.

19. A computer program product for a technical analytical system, the computer program product comprising:
    one or more computer readable storage media, and program instructions collectively stored on the one or more computer readable storage media, the program instructions comprising program instructions for:
      loading a matrix system into the memory;
      performing a domain decomposition into non-overlapping subdomains and a reordering of matrices of the matrix system;
      creating an interface variable projection subspace associated with interface variables of an adjacency graph of the matrix system, wherein the interface variables are related to nodes of the adjacency graph which are connected with nodes located in neighboring partitions;
      creating an internal variable projection subspace associated with internal variables of the adjacency graph of the matrix system, wherein the internal variables are related to nodes of the adjacency graph which are connected only to nodes located in the same partition;
      building a projection matrix based on the interface variable projection subspace and the internal variable projection subspace;
      determining eigenvalues that solve a Raleigh-Ritz eigenvalue problem utilizing the projection matrix; and utilizing the determined eigenvalues in a technical application system.

20. The computer program product of claim 19, wherein:

the matrix system is a large sparse symmetric matrix pencil (A, M) comprising matrix A and matrix M, the matrix pencil constituting a domain of the matrix system;

matrix A and matrix M are symmetric;

matrix M is a symmetric positive definite matrix; and the performing of the domain decomposition utilizes an algebraic graph partitioner on an adjacency graph associated with the matrix system.

* * * * *